Figure 1:
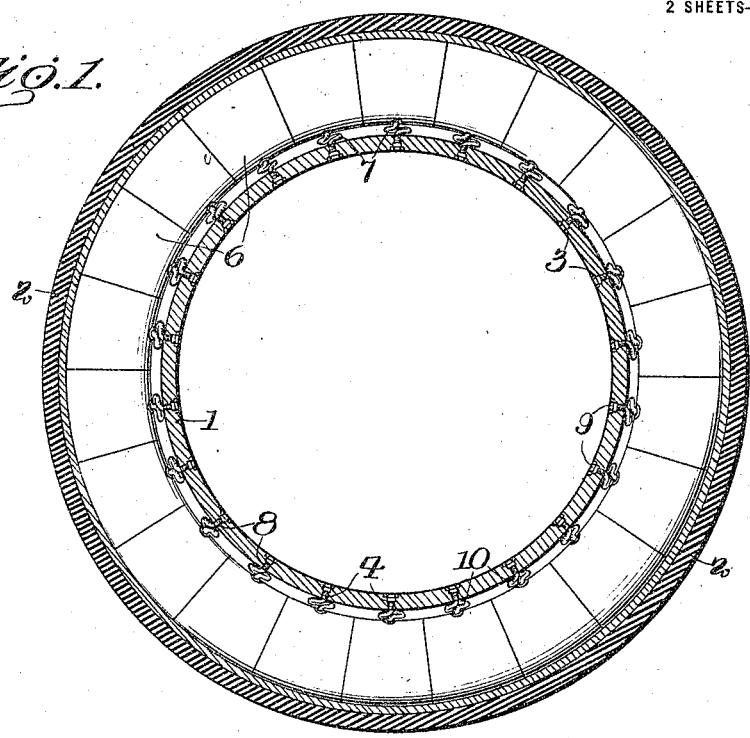

J. W. TURNER.
MULTIPLE CHAMBER PNEUMATIC TIRE.
APPLICATION FILED JULY 28, 1914.

1,154,817.

Patented Sept. 28, 1915.
2 SHEETS—SHEET 1.

Witnesses
Inventor
Jessee W. Turner
Attorney

J. W. TURNER.
MULTIPLE CHAMBER PNEUMATIC TIRE.
APPLICATION FILED JULY 28, 1914.

1,154,817.

Patented Sept. 28, 1915.
2 SHEETS—SHEET 2.

Witnesses

Inventor
Jessee W. Turner
By
Attorney

UNITED STATES PATENT OFFICE.

JESSEE WEBB TURNER, OF KIRKSVILLE, MISSOURI.

MULTIPLE-CHAMBER PNEUMATIC TIRE.

1,154,817.   Specification of Letters Patent.   Patented Sept. 28, 1915.

Application filed July 28, 1914. Serial No. 853,739.

*To all whom it may concern:*

Be it known that I, JESSEE W. TURNER, a citizen of the United States, residing at Kirksville, Adair county, Missouri, have invented a certain new and useful Multiple-Chamber Pneumatic Tire, of which the following is a specification.

My invention relates to pneumatic tires of the multiple chamber type.

The object of the invention is to provide a tire of the type named with a multiplicity, that is to say, a large number of, separate and independent bags or chambers arranged end to end within the space between the demountable rim and tire-casing; each bag or chamber being provided with a filling neck arranged to permit a longitudinal sliding movement of the bags or chambers around the rim so that in the event of one bag or chamber being punctured or collapsed the other bags of the series will all move bodily toward the space occupied by said collapsed bag or chamber and cause the said space to be filled. The particular manner of affording such longitudinal play at present employed by me is to provide the bags or chambers with flexible necks or filling tubes of sufficient length beyond the inner side of the rim to allow of the necessary movement. Owing to the great number of bags or chambers employed the amount of movement necessary to the individual bags or compartments to permit them to close up the gap formed by a collapsed bag is very slight as is also the endwise expansion of the bags. For instance, there are twenty-two bags or compartments shown in the drawing, and were the tire twenty-two inches in diameter each bag would, in practice, be about three inches long. I am aware that multi-chambered pneumatic tires in which every bag or chamber has its own filling tube or neck, are old, but I am not aware that such chambers were entirely separate and independent one of the other and of the demountable rim and casing, with their filling necks so arranged with respect to the rim and casing as to allow endwise sliding movement of the bags or chambers to close the gap due to the collapsing of one of said bags or chambers, and this is the essential feature of my invention. The above object I accomplish by the construction shown in the accompanying drawing, in which—

Figure 2:
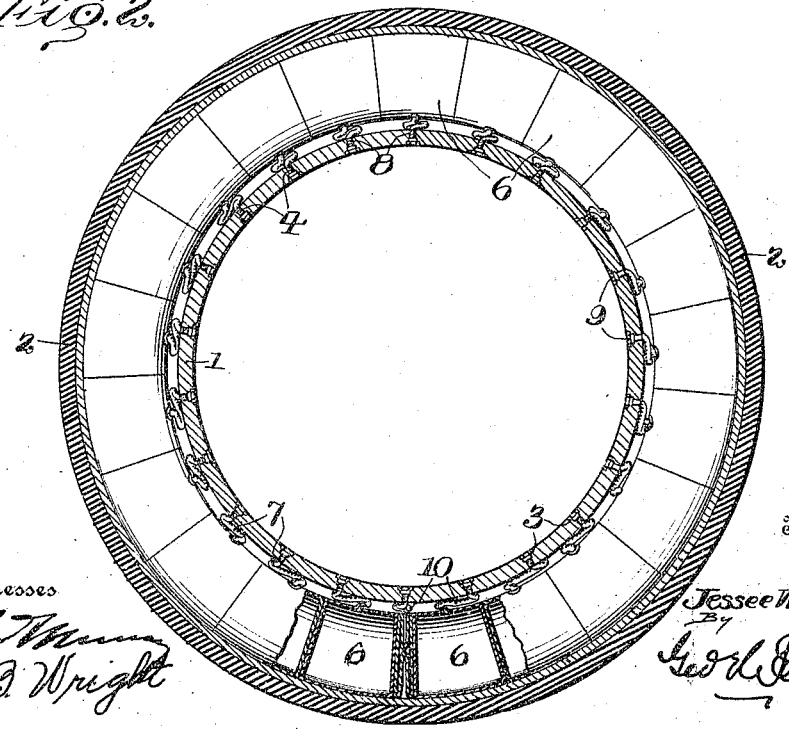
Figure 3:
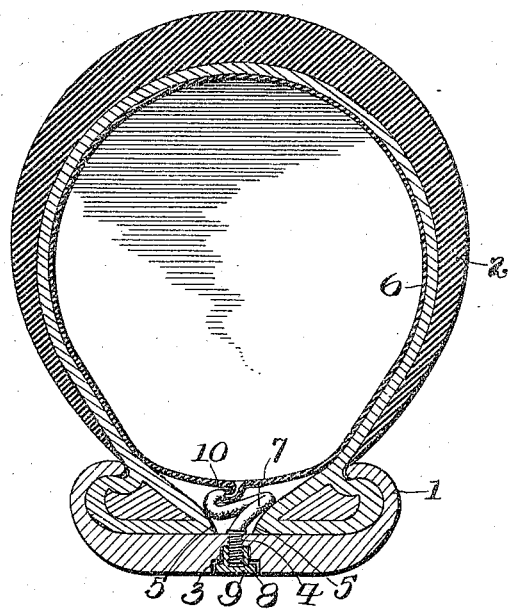
Figure 4:
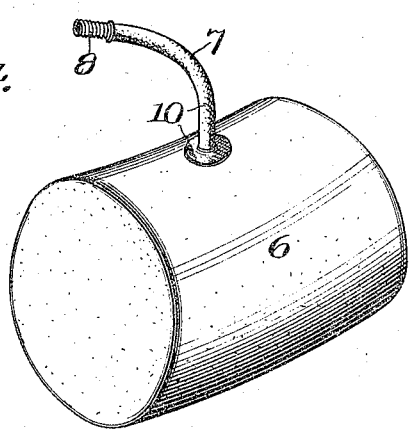

Figure 1 is a sectional side elevation of a tire provided with my improvement; all of the bags or chambers being inflated. Fig. 2 is a similar view showing one of the bags or chambers collapsed and the space closed by the sliding up of the remaining bags or chambers. Fig. 3 is a cross-section through the tire on line 3—3, Fig. 1. Fig. 4 is a perspective of one of the individual bags or compartments.

The demountable rim 1, and the outer casing 2, may be of the usual or any desired types. The rim 1 is provided, as shown, with an annular series of twenty-two recesses 3 in its inner face and from the bases of these recesses threaded perforations 4 extend; such perforations and recesses lying half way between the side edges of the rim and so register with the annular open space between the edges 5—5 of the outer casing 2.

The pneumatic bags or chambers 6, are placed end to end within the casing 2, and every bag has a flexible elongated tube or neck 7 terminating in an air valve 8, screwed in the perforations 4. The caps 9 are screwed upon the exposed ends of the air valves 8, and lie within the recesses 3, flush with the inner face of the rim. The tire as a whole including the demountable rim 1 may be easily passed upon any of the modern wheels adapted for demountable tires, as the inner periphery of the rim 1 has no projecting parts, owing to the air valves 8 and their caps 9 lying flush therewith. Any suitable form of air valve may be used and the series of bags may be inflated simultaneously by any suitable multi-nozzle device or the bags may be inflated separately.

The bags or compartments 6, are wholly independent one of the other, not being cemented together or otherwise connected, and they are wholly disconnected from casing 2 and from the rim 1, except the loose connection afforded by the elongated flexible filling necks 7. The necks 7 are reinforced in any suitable manner where they join the bags 6; a cloth reinforce 10 being shown.

When the bags or compartments 6, are all properly inflated they engage the casing and support it just as do the continuous inner tubes now commonly employed, since the bags are distended endwise into firm contact one with the other. But on one of the bags becoming collapsed as from a puncture or leakage, the remaining bags of the series immediately fill up the gap. This is due to the weight imposed on the tire tending to flatten it and in turn flatten and separate the bags. This tendency to flatten and separate the bags also tends to move them instantly endwise until the two bags next to the collapsed one fill the gap caused thereby and as there are so many bags a slight longitudinal movement only of the others is necessary to cause the proper readjustment of the series. Of course, there will be a flattening of the tire casing or outer tube, but it will not be sufficient to prevent the tire acting properly until the machine may be gotten to a place where a new bag may be inserted or the old one repaired. With a continuous inner tube all the air would escape and the tire collapse while in the example shown only one-twenty-second of the total amount of air would escape and the readjustment of the remaining amount would be so quickly effected as to not interfere with the proper operation of the tire.

As before stated, it is essential that the bags have freedom of movement where the filling tubes pass through the rim as a rigid connection between the bags and rim at the filling tubes would render the objects sought by me impossible. Furthermore, it is obvious that serious blow-outs of the tire are rendered improbable if not impossible since no one bag contains a sufficient volume of compressed air to produce such a result. The explosion of a large gas bag in a balloon casing would obviously rip the casing to pieces, but were the casing filled with a large number of very small closely contacting gas bags, the explosion of one of them would not affect the casing, since the small volume of gas contained in one of the small bags would find room to expand and lose its force without rupturing the outer casing, while the explosion of all the gas bags would rend the casing in pieces.

The number of bags shown is, of course, only by way of illustration, as the larger the tire the greater the number of bags; and the term "bags" is intended to cover any like chambers regardless of the material employed.

What I claim is:

1. In a pneumatic tire, a casing, a demountable rim provided with a circularly arranged series of valve openings or ports therethrough, of a circular series of separate and independent pneumatic bags placed end to end within the tire casing and sufficient in number to permit the closing of a gap when formed by a collapsed bag, and filling tubes each having its own individual air inlet valve mounted in the rim opening or port, said tubes loosely connecting the individual bags with the rim to thereby permit a bodily endwise movement of the bags within the casing.

2. In a pneumatic tire, a rim having a circular series of valve openings therethrough, a casing mounted on the rim, a series of separate and independent air bags arranged end to end within the casing and each having an elongated filling tube or neck terminating in an air inlet valve removably mounted in one of the rim apertures; said valves at their outer ends being adapted to connect with a compressed air supply.

In testimony whereof I affix my signature in presence of two witnesses.

JESSEE WEBB TURNER.

Witnesses:
ANNIE E. TURNER,
FAYETTE H. TURNER.